US005732352A

United States Patent [19]
Gutowski et al.

[11] Patent Number: 5,732,352
[45] Date of Patent: Mar. 24, 1998

[54] METHOD AND APPARATUS FOR PERFORMING HANDOFF IN A WIRELESS COMMUNICATION SYSTEM

[75] Inventors: Gerald J. Gutowski, Palatine; Jeffrey D. Bonta, Arlington Heights, both of Ill.

[73] Assignee: Motorola, Inc., Schaumburg, Ill.

[21] Appl. No.: 536,312

[22] Filed: Sep. 29, 1995

[51] Int. Cl.[6] .................................................. H04Q 7/38
[52] U.S. Cl. .................. 455/437; 455/502; 370/333; 375/368
[58] Field of Search .......................... 455/33.2, 33.1, 455/54.1, 56.1, 51.1, 502, 437, 438; 379/59, 60; 370/95.3, 100.1, 105.1, 105.4, 105.5, 106, 332, 333; 375/365, 366, 368

[56] References Cited

U.S. PATENT DOCUMENTS

| | | | |
|---|---|---|---|
| 3,883,729 | 5/1975 | De Cremiers | 370/105.4 |
| 4,876,740 | 10/1989 | Levine et al. | 455/33.2 |
| 5,054,035 | 10/1991 | Tarallo et al. | 375/368 |
| 5,199,031 | 3/1993 | Dahlin | 370/110.1 |
| 5,260,943 | 11/1993 | Comroe et al. | 370/95.1 |
| 5,535,429 | 7/1996 | Bergenlid et al. | 455/53.1 |

OTHER PUBLICATIONS

Empirical Formula for Propagation Loss in Land Mobile Radio Services, Masaharu Hata, IEEE Transactions on Vehicular Technology, vol. VT–29, No. 3, Aug. 1980.

Investigation of Propagation Characteristics above 1 GHz for Microcellular Land Mobile Radio, Iwama, Moriyama, Ryuko, Sekizawa and Saruwatari, IEEE Transactions on Vehiculr Technology, May 1990.

Radio Propagation at Microwave Frequencies for Line-of--Sight Microcellular Mobile and Personal Communications, Rustako, Jr., Amitay, Owens and Roman, IEEE Transactions on Vehicular Technology, vol. 40, No. 1, Feb. 1991.

Network and Radio Receiver Simulation Studies of the Pan-European Digital Cellular System, Labedz and Reilly, IEEE Transactions on Vehicular Technology, vol. 41, May 1991.

4.1 Layer 1 Standards RCR STD–27A, Ver 2/92, Chapter 4.

Digital Tranmission of Information, Richard E. Blahut, 10.4 Block Synchronization, ISBN 0–201–06880–X, 1990.

European Digital Cellular Telecommunication System (Phase 2); Radio Sub–system Link Control, ETSI GSM 05.08, Version 4.5.0, Apr. 1993.

*Primary Examiner*—Reinhard J. Eisenzopf
*Assistant Examiner*—Lee Nguyen
*Attorney, Agent, or Firm*—Raymond J. Warren

[57] ABSTRACT

A method including the steps of performing a synchronization measurement of a received signal (102), and performing a handoff (110) between a first communication channel and a second communication channel in response to the synchronization measurement. An apparatus including a receiver (50) detecting a received signal over a first communication channel, a receive signal processor (44) responsive to the receiver (50), and a handover controller (40) responsive to the receive signal processor (44). The receive signal processor performs a synchronization measurement of the received signal. The handover controller (40) initiates a handoff between the first communication channel and a second communication channel in response to the synchronization measurement.

6 Claims, 4 Drawing Sheets

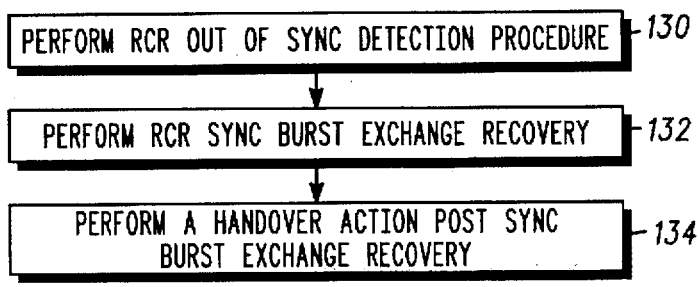
FIG. 5
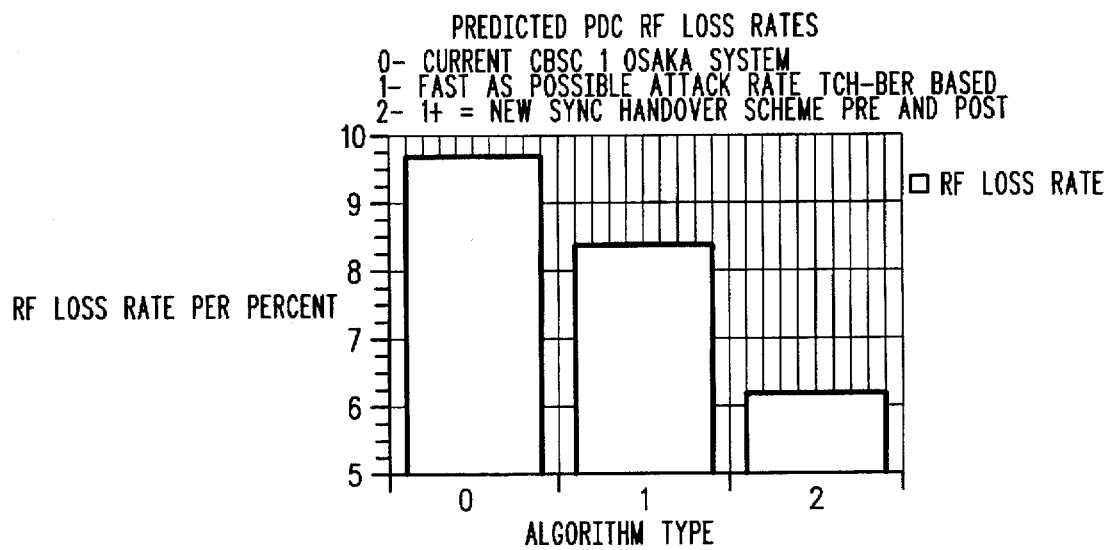
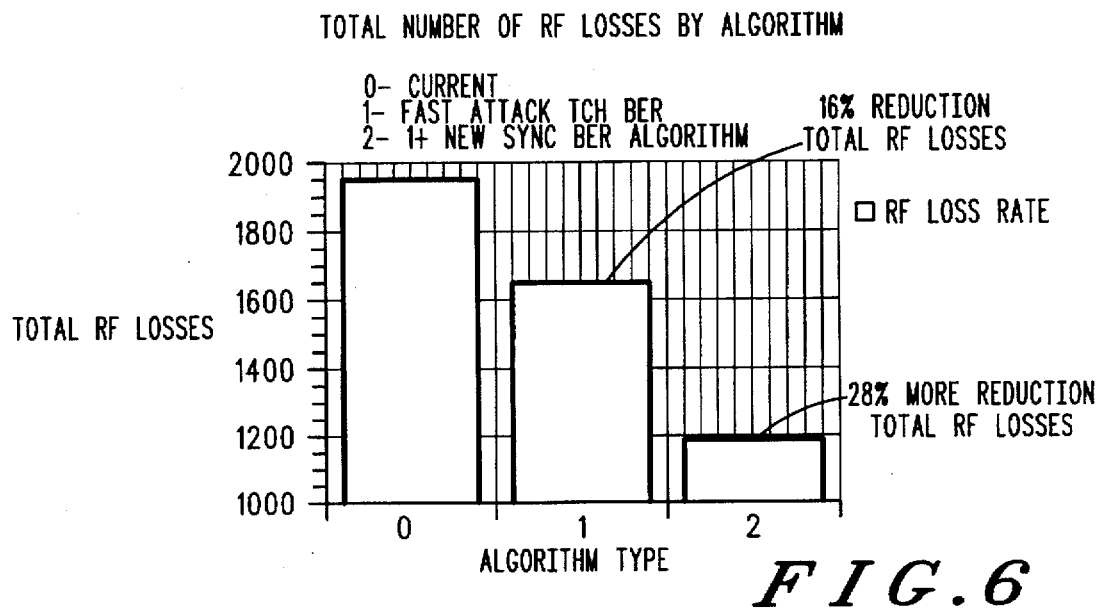
FIG. 6

METHOD AND APPARATUS FOR PERFORMING HANDOFF IN A WIRELESS COMMUNICATION SYSTEM

FIELD OF THE INVENTION

This invention relates generally to wireless communication systems, and more particularly to performing handoff in a wireless communication system.

BACKGROUND OF THE INVENTION

In conventional wireless communication systems that handle voice calls, a premium is placed on minimizing the number of dropped calls. Dropped calls cause a loss of revenue to a wireless communication system operator, such as a cellular operating company, and also leads to customer dissatisfaction with wireless communication service. For example, cellular subscribers who lose communication on a cellular telephone call would have to call again and would thereby be inconvenienced by the dropped call.

Accordingly, there is a need for a method and apparatus for improving wireless communication system performance by reducing the number of dropped calls.

SUMMARY OF THE INVENTION

The present invention addresses this need by providing a method and apparatus for performing handoff in a wireless communication system that reduces dropped calls. The method includes the steps of performing a synchronization measurement of a received signal, and performing a handoff between a first communication channel and a second communication channel in response to the synchronization measurement. The apparatus includes a receiver detecting a received signal over a first communication channel, a receive signal processor responsive to the receiver, and a handover controller responsive to the receive signal processor. The receive signal processor performs a synchronization measurement of the received signal. The handover controller initiates a handoff between the first communication channel and a second communication channel in response to the synchronization measurement.

These and other features, aspects, and advantages of the present invention will become better understood by reference to the following detailed description and appended claims, taken in conjunction with the accompanying drawings.

BRIEF DESCRIPTION OF THE DRAWINGS

FIG. 5 is a flowchart illustrating a preferred method of post-synchronization handoff.

FIG. 6 is a graph from a computer simulation illustrating reduction of dropped calls in the cellular wireless communication system of FIG. 1.

DETAILED DESCRIPTION OF THE PREFERRED EMBODIMENTS

Figure 1:
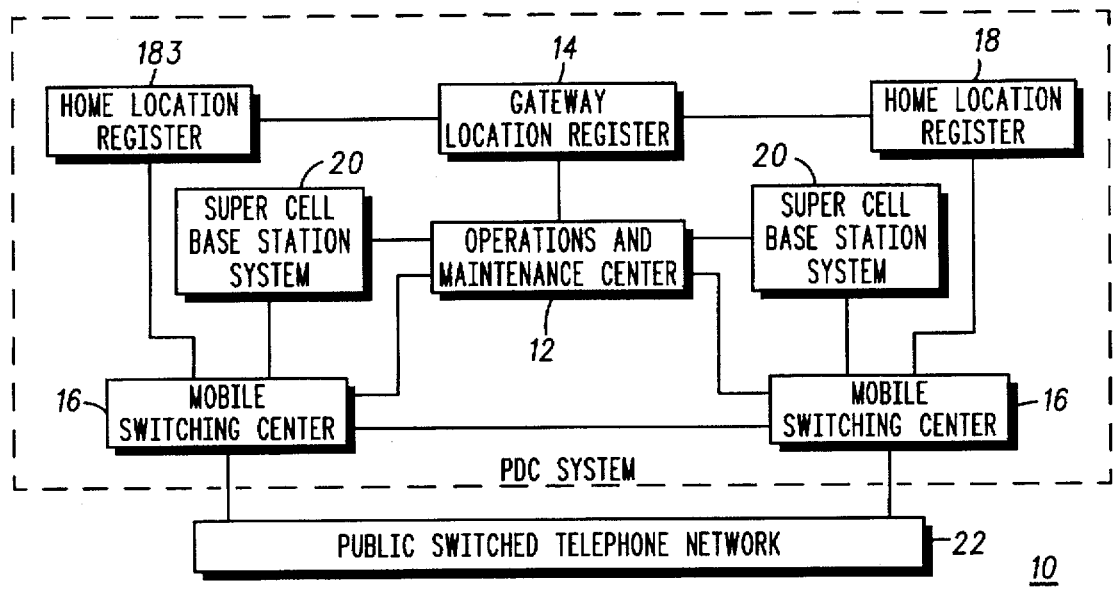
FIG. 1 is a block diagram illustrating a preferred embodiment of a cellular wireless communication system.

FIG. 1 illustrates a preferred embodiment of a wireless communication system 10. The wireless communication system 10 is preferably a cellular system such as that defined by the Digital Cellular Telecommunication System for PDC specification RCR Standard 27A (PDC standard). Although reference will be made herein to the PDC standard, the present invention is applicable to other wireless communication systems such as GSM, USDC, and AMPS type systems. The wireless communication systems may be a time division multiple access, frequency division multiple access, or a code division multiple access system.

The wireless communication system 10 includes an operations and maintenance center (OMC) 12, a gateway location register (GLR) 14, mobile switching centers (MSC) 16, home location registers (HLR) 18, and base station systems (BSS) 20. The MSCs 16 are each connected to a public switched telephone network (PSTN) 22 using standard communication links. As shown in FIG. 1, each MSC 16 is connected to the OMC 12, a BSS 20, and an HLR 18. The GLR 14 is connected to the HLRs 18 and to the OMC 12. Each BSS 20 is connected to the OMC 12. A more detailed description of the architecture of the wireless communication system may be found in the PDC standard which is incorporated by reference herein.

Figure 2:
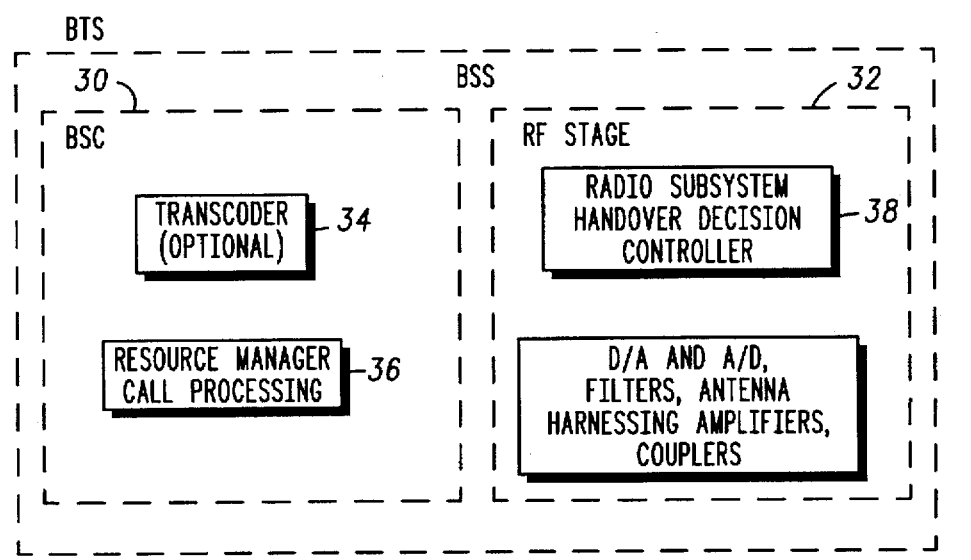
FIG. 2 is a block diagram of the base station system of FIG. 1.

FIG. 2 is a block diagram illustrating the BSS 20. The BSS 20 includes a base station controller (BSC) 30 and an RF stage 32. The BSC 30 includes an optional transcoder 34 and traditional resource manager and call processing functions 36. The RF stage 32 includes a radio subsystem controller 38 and RF detection hardware 40. The BSS 20 is preferably a Motorola SuperCell SC 9600™ base station.

Figure 3:
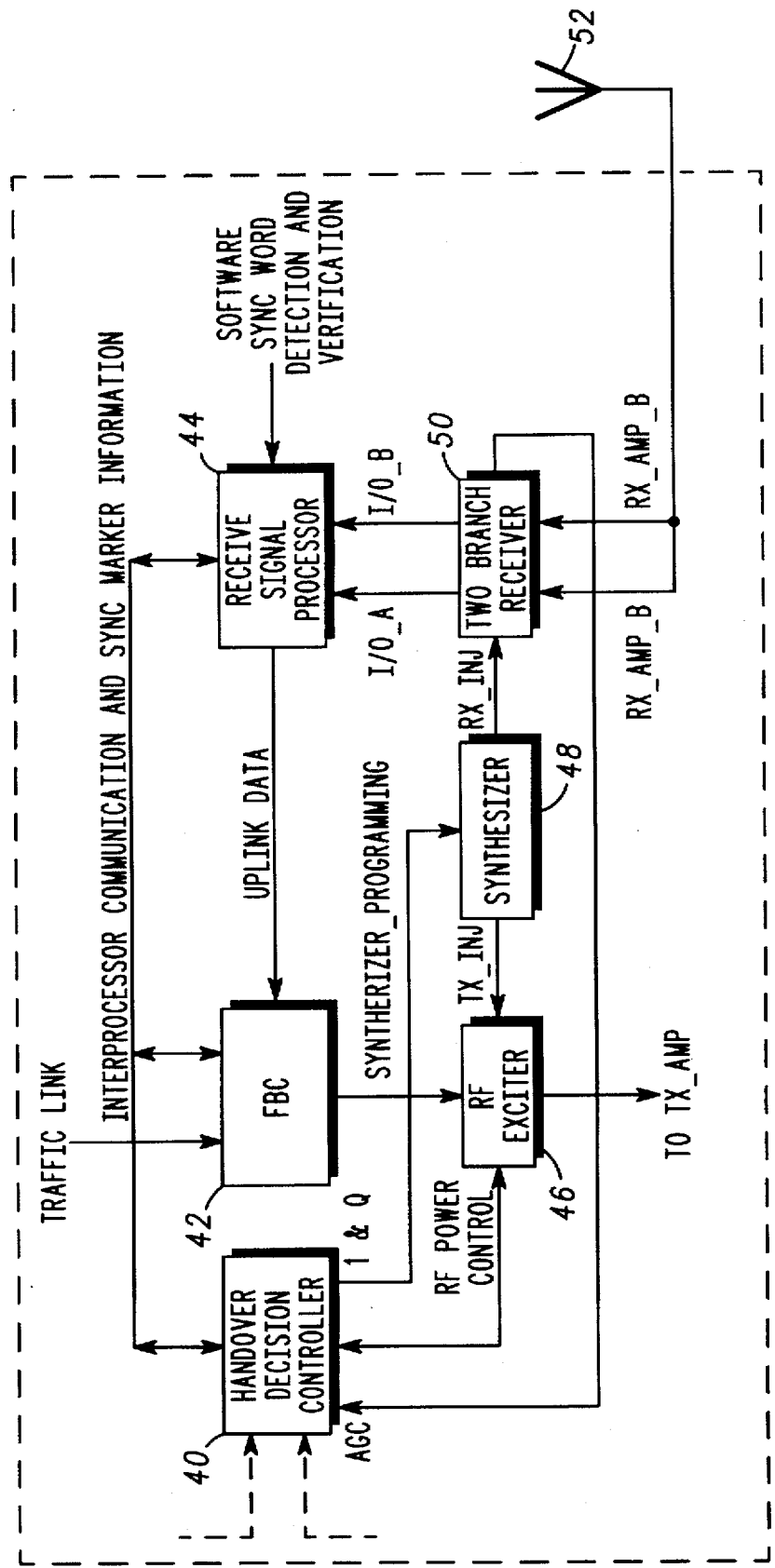
FIG. 3 is a block diagram of the radio subsystem controller of FIG. 2.

FIG. 3 is a more detailed block diagram of the radio subsystem controller 38. The radio subsystem 38 includes a handover decision controller 40, a forward error correction (FEC) unit 42, a receive signal processor 44; an RF exciter unit 46, a synthesizer 48, a two branch receiver 50, and an antenna 52. As shown in FIG. 3, the handover decision controller 40 is responsive to the RF exciter unit 46, the two branch receiver 50, the FEC unit 42, and the receive signal processor 44. The two branch receiver 50 is connected to the antenna 52 and provides diversity reception. The receive signal processor 44 is responsive to the two branch receiver 50 and the FEC unit 42. In the preferred embodiment, the FEC unit 42, the RF excited unit 46, and the synthesizer 48 are components within a SC9600™ transceiver from Motorola. Further, the handover decision controller 40 is a programmed processor such as a 68302 type processor from Motorola. Similarly, the receive signal processor 44 includes a 56156 DSP type processor from Motorola. The two branch receiver 50 is a super hetrodyne type receiver from Motorola.

During operation, a signal, such as a traffic burst from a mobile communication unit, is received by the antenna 52 and detected by the receiver 50. Preferably, the received signal contains a unique word field, such as a synchronization marker or a midamble as defined by the PDC standard. The receiver 50 performs diversity reception and generates I and Q component signals that are fed into the receive signal processor 44. In the preferred embodiment, the receive signal processor performs synchronization word detection and verification based on the received I and Q signals from the receiver 50. The receive signal processor 44 sends synchronization information, such as synchronization marker detection information, to the handover decision controller 40. The handover decision controller 40 receives the synchronization information from the receive signal processor 44 and selectively performs handover between the currently received communication channel and an alternative communication channel in response to the synchronization information.

The handover decision controller upon detecting the need for a handover signals the call processing resource manager 36 to perform a handover. Resource manager 36 maintains a free list of available communication channels for the cell. A channel is then selected from the pool. A channel from a different carrier in the same cell is preferred to avoid interference that may have induced synchronization problems on the first channel. Then the resource manager 36 sends a message to the mobile subscriber unit instructing the handover to the new channel.

The alternative communication channel may be any available communication other then the currently received channel. Preferably, the alternative communication channel is a new time slot within the same frequency as the received channel, a new frequency, or a new sector within the same cell.

Figure 4:
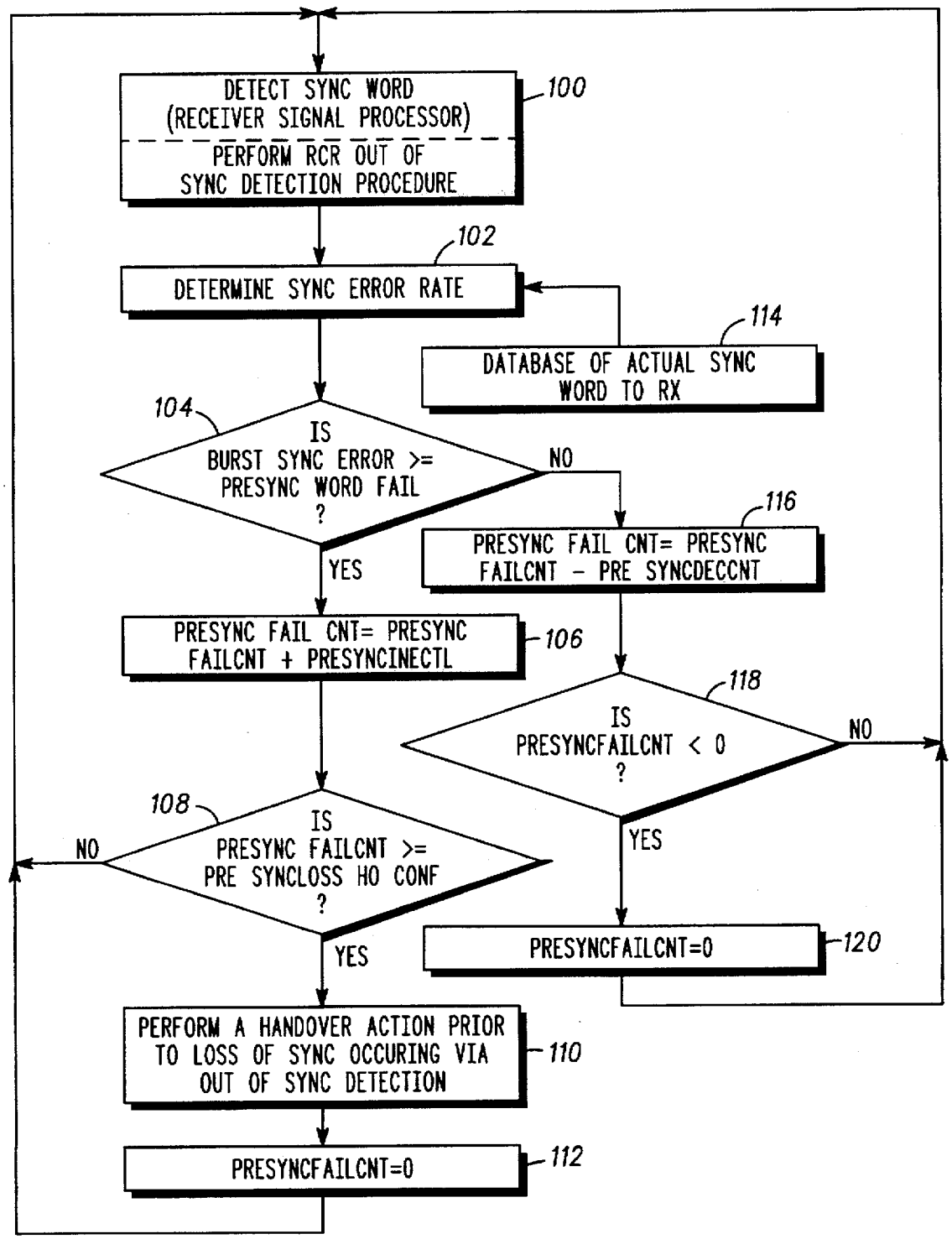
FIG. 4 is a flowchart illustrating a preferred method of pre-synchronization handoff.

Referring to FIG. 4, a preferred method of performing handoff based on detection of possible synchronization loss, defined as a pre-synchronization loss schema, is illustrated. First, at 100, a synchronization word within a received signal is detected by the receive signal processor 44. The synchronization word is preferably a unique word, such as a synchronization marker or a midamble as defined in the PDC standard. Next, at 102, a synchronization error rate for the detected synchronization word is determined. One preferred method of determining the synchronization error rate is to read a pattern, such as an expected synchronization sequence from a memory, at 114, the memory being readable by the receive signal processor 44, and to compare the received synchronization word to the expected synchronization word on a bit by bit basis. Any discrepancies are counted as error bits. Next, at decision step 104, the number of detected errors is compared to a first threshold. If the number of detected errors exceeds the first threshold then a pre-synchronization failure count is incremented, at 106. Otherwise, the pre-synchronization failure count is decremented, at 116, and is then checked for a boundary condition. The boundary condition is performed by a comparison to zero at 118, and by resetting the count to zero at 120 if the count is less then zero.

In the case where the count of errors exceeds the first threshold, a comparison is performed between the pre-synchronization failure count and a second threshold called the pre-synchronization loss handover threshold. If the count of failed synchronization words exceeds the second threshold, then a handover is performed by the handover decision controller 40, at step 110, and the pre-synchronization failure count is reset to zero, at 112. Otherwise, processing is continued back at 100.

In the preferred method, the steps of detecting synchronization 100 and determining a synchronization error rate 102 are conducted as set forth in the PDC standard. Although many values for the thresholds may be used, the presently preferred method for the pre-synchronization procedure is to set the first threshold to two and to set the second threshold to five. In this case, a pre-synchronization error condition will be detected when two bits of the detected synchronization word is in error for five consecutive frames. Those skilled in the art will appreciate that other techniques for detecting pre-synchronization loss may also be used. For example, an average of the measured error count or any other method to measure the correlation between the received synchronization word and the expected pattern may be used.

The above method has many benefits. For example, the pre-synchronization handover scheme enables a PDC mobile to switch a communication channel currently exhibiting a trend of synchronization problems to a new channel via a handover. This operation is opposed to allowing the PDC RCR out of sync procedure to declare a sync loss and merely perform the standard re-synchronization RCR procedure. The conventional RCR PDC procedures force the mobile to stay locked on the original communication channel. It has been observed in the field that without the above method a PDC mobile could experience loss of sync then perform the re-sync procedure cyclically with no attempt to improve the communication channel, thereby causing dropped calls as well as numerous audio holes in the speech.

Referring to FIG. 5, a method of performing handover after synchronization loss has occurred is illustrated. First, at 130, detection of an out of synchronization condition is performed. A suitable method of detecting an out of synchronization condition is defined in the PDC standard. Next, at 132, a synchronization burst exchange recovery process is performed. In the preferred embodiment, the process of synchronization exchange recovery uses a synchronization marker recovery procedure to determine that the synchronization marker has been successfully re acquired. Further details of synchronization burst exchange recovery may be found in the PDC standard. Finally, at 134, handover is performed, preferably an intercell handover to a different carrier or a different time slot on the same cell in order to avoid a reoccurrence of the loss of sync which may have been induced by an interferer on the first channel.

Referring to FIG. 6, a graph illustrating dropped call performance in a computer simulation of the preferred method compared to conventional techniques is illustrated. As shown in FIG. 6, when both the pre-synchronization method, FIG. 4, and the post synchronization method, FIG. 5, is used, the number of lost calls is reduced by about 28%. Thus, performance of the wireless communication system 10 is greatly improved by use of the preferred method.

Further advantages and modifications of the above described apparatus and method will readily occur to those skilled in the art. For example, in an analog cellular system such as AMPS, the communication link between the mobile and base is maintained with Supervisory Audio Tone (SAT) which is a low frequency continuity signal transmitted on the traffic channel carrier. The receivers in the mobile and base each monitor the traffic channel for the presence of this SAT signal. If SAT is not detected for a predetermined period, then the communication link is considered to have failed and the call is lost. In a modification to this described analog apparatus and method, the base could initiate a handover to a new channel in the event that the absence of SAT is detected with greater regularity prior to complete and consistent loss of SAT.

In an alternative embodiment, a mobile unit in communication with the base station 20 may intentionally transmit errors in the link synchronization marker when the mobile detects downlink synchronization failure counts above a threshold resulting from a poor communication link from the base to the mobile. The base station 20 detects the errors in the received synchronization word invokes a handover to a new channel. In this manner, downlink synchronization conditions may also be used to invoke a handoff.

The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method of performing handoff in a wireless communication system comprising the steps of:

receiving a radio frequency signal;

detecting a synchronization marker within the radio frequency signal;

measuring a correlation by comparing the synchronization marker and a pattern;

comparing the correlation to a threshold;

transmitting in a return signal, if the threshold is met, an invalid synchronization marker;

receiving the return signal;

detecting the invalid synchronization marker within the return signal;

measuring a correlation by comparing the invalid synchronization marker with the pattern;

comparing the correlation to a threshold; and performing a handoff from a first channel to a second channel in response to the comparison of the correlation to the threshold.

2. The method of claim 1, further comprising the steps of:

detecting a plurality of synchronization markers;

measuring a plurality of correlations between the plurality of synchronization markers and the pattern;

comparing each of the correlations to the threshold to generate a series of correlation values; and performing the handoff from the first channel to the second channel in response to the series of correlation values.

3. The method of claim 2, wherein the handoff is performed based on an average of the series of correlation values.

4. The method of claim 1, wherein the first channel and the second channel are within the same cell of the wireless communication system.

5. The apparatus of claim 1, wherein the wireless communication system is selected from the group consisting essentially of a time division multiple access system, a frequency division multiple access system, and a code division multiple access system.

6. A method of performing handoff in a wireless communication system comprising the steps of:

receiving a radio frequency signal from a base station;

detecting a synchronization marker within the radio frequency signal;

measuring a correlation by comparing the synchronization marker and a pattern;

comparing the correlation to a first threshold;

transmitting in a return signal to the base station, if the first threshold is met, an invalid synchronization marker;

receiving the return signal at the base station;

detecting the invalid synchronization marker within the return signal;

measuring a correlation by comparing the invalid synchronization marker with the pattern;

comparing the correlation to a second threshold; and directing a handoff from a first channel to a second channel in response to the comparison of the correlation to the second threshold.

* * * * *